(12) United States Patent
Webb et al.

(10) Patent No.: US 7,511,388 B2
(45) Date of Patent: Mar. 31, 2009

(54) SYSTEM AND METHOD OF DETECTION OF POWER LOSS IN POWERED ETHERNET DEVICES

(75) Inventors: Richard B. Webb, Austin, TX (US); D. Matthew Landry, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 373 days.

(21) Appl. No.: 11/448,065

(22) Filed: Jun. 6, 2006

(65) Prior Publication Data

US 2007/0283173 A1 Dec. 6, 2007

(51) Int. Cl.
*H02J 4/00* (2006.01)
*H02J 1/00* (2006.01)
*H02J 3/14* (2006.01)

(52) U.S. Cl. .......................................... 307/31; 307/39
(58) Field of Classification Search ........................ None
See application file for complete search history.

(56) References Cited

U.S. PATENT DOCUMENTS

| 5,099,453 | A | 3/1992 | Steele |
| 5,570,258 | A * | 10/1996 | Manning ..................... 361/85 |
| 5,943,246 | A | 8/1999 | Porter |
| 5,962,930 | A | 10/1999 | Cluff et al. |
| 6,115,468 | A * | 9/2000 | De Nicolo .................. 379/413 |
| 6,535,983 | B1 * | 3/2003 | McCormack et al. ....... 713/310 |
| 6,977,485 | B1 * | 12/2005 | Wei ............................. 320/139 |
| 6,982,500 | B2 | 1/2006 | Zhang et al. |
| 6,996,746 | B2 | 2/2006 | Shukla et al. |
| 7,299,368 | B2 * | 11/2007 | Peker et al. .................. 713/300 |
| 7,342,761 | B2 * | 3/2008 | Covault ...................... 361/93.1 |
| 2005/0073786 | A1 * | 4/2005 | Turnbull et al. ............. 361/93.1 |
| 2006/0092000 | A1 * | 5/2006 | Karam et al. ........... 340/310.11 |
| 2007/0079151 | A1 * | 4/2007 | Connor et al. .............. 713/300 |
| 2007/0263332 | A1 * | 11/2007 | Apfel ........................... 361/90 |

\* cited by examiner

*Primary Examiner*—Albert W Paladini
*Assistant Examiner*—Adi Amrany
(74) *Attorney, Agent, or Firm*—Westman, Champlin & Kelly, P.A.; R. Michael Reed

(57) ABSTRACT

A powered device includes a power supply input, a diode bridge, and a power loss detector. The power supply input is responsive to an external power source. The diode bridge has an input to receive at least one power supply input. The power loss detector includes an input responsive to the power supply input. The power loss detector is adapted to detect a power loss event and to initiate a power shutdown. In one embodiment, the powered device includes a load circuit to receive a power supply voltage from the diode bridge. The load circuit is responsive to the power loss detector to perform a power shutdown operation.

18 Claims, 7 Drawing Sheets

US 7,511,388 B2

SYSTEM AND METHOD OF DETECTION OF POWER LOSS IN POWERED ETHERNET DEVICES

FIELD OF THE DISCLOSURE

The present disclosure is generally related to power loss detection in electronic devices, and more particularly, to power loss detection in electronic devices that receive power and data via a single cable.

BACKGROUND

In general, power over Ethernet (PoE) refers to a technique for delivering power via Ethernet cabling to a powered device, which is an electronic device adapted to derive power from the Ethernet cabling and which is outlined in IEEE Std 802.3™-2005 clause 33. PoE eliminates the need for a separate power source for powered devices, simplifying installation. Powered devices may include voice over Internet protocol (VoIP) telephones, wireless routers, security devices, field devices to monitor process control parameters, data processors, and the like.

An unexpected loss of power to a powered device may cause loss of data, loss of a device's state, and so on. Moreover, an unexpected power loss event may cause problems with associated software. An unexpected loss of power may occur, for example, when an Ethernet cable is disconnected from the powered device. To perform a controlled shutdown (e.g. to allow time for storing a machine state and to initiate a controlled shutdown of associated circuitry), sufficient time to execute such processes is needed after detection of a power loss event.

The IEEE Std 802.3™-2005 standard specifies that a powered device should include an input filter capacitor of less than 120 nF and greater than 50 nF, and that an input power supply ripple at the input of an Ethernet cable to the powered device (at an RJ-45 input, for example), and at a switching frequency of 350 kHz, should be less than 100 mV. This input filter capacitor introduces a capacitive time constant that produces a voltage decay in response to a power loss event. The input filter capacitor initially discharges to provide a filtered voltage supply with a relatively linear decreasing slope, which may be difficult to detect relative to other types of power fluctuations. Even when a power source has been removed, the filter capacitor may prevent powered circuitry coupled in parallel with the capacitor from experiencing immediate power loss, since the capacitor discharges like a battery. Therefore, there is a need for enhanced power loss detection in powered electronic devices.

SUMMARY

In one particular embodiment, a powered device includes a power supply input, a diode bridge, and a power loss detector. The power supply input is responsive to an external power source. The diode bridge has an input to receive at least one power supply input. The power loss detector includes an input responsive to the power supply input. The power loss detector is adapted to detect a power loss event and to initiate a power shutdown. In one embodiment, the powered device includes a load circuit to receive a power supply voltage from the diode bridge. The load circuit is responsive to the power loss detector to perform a power shutdown operation after the power loss detector initiates the power shutdown.

In another particular embodiment, a powered device is coupled to a network to receive power and data from the network via a cable. The powered device includes at least one power supply input, a first supply terminal, a second supply terminal, a diode bridge, an input filter capacitor, and a power loss detector. The power supply input is responsive to a wire of a cable, where the cable provides data and power. The diode bridge includes an input to receive the power supply input and has an output to provide a rectified supply voltage to the first and the second supply terminals. The input filter capacitor is coupled between the first supply terminal and the second supply terminal. The power loss detector has an input responsive to the at least one power supply input. The power loss detector detects a power loss event and automatically initiates a power shutdown when a voltage level of the at least one power supply input falls below a threshold level.

In still another particular embodiment, a method includes monitoring an input voltage at an input port of a powered device, where the powered device includes power circuitry responsive to the input port to rectify the input voltage to produce a rectified voltage supply. The method further includes comparing the input voltage to a threshold voltage level, and detecting a power loss event to initiate a power shutdown when the input voltage falls below the threshold voltage level, where the power loss event is detected concurrently while the rectified voltage supply of the associated input voltage is being produced.

In yet another particular embodiment, an electronic device is coupled to a network to receive power and data. The electronic device includes a rectifier circuit including a power supply input to receive a power supply via a network cable and to provide a rectified power supply to a first power supply terminal and to a second power supply terminal, where the network cable carries power and data. The electronic device also includes a capacitor and logic. The capacitor is coupled between the first and the second power supply terminals to filter the rectified power supply. The logic is responsive to the power supply input to generate a power loss indication when the power supply is less than a threshold voltage level.

DETAILED DESCRIPTION OF THE DRAWINGS

Figure 1:
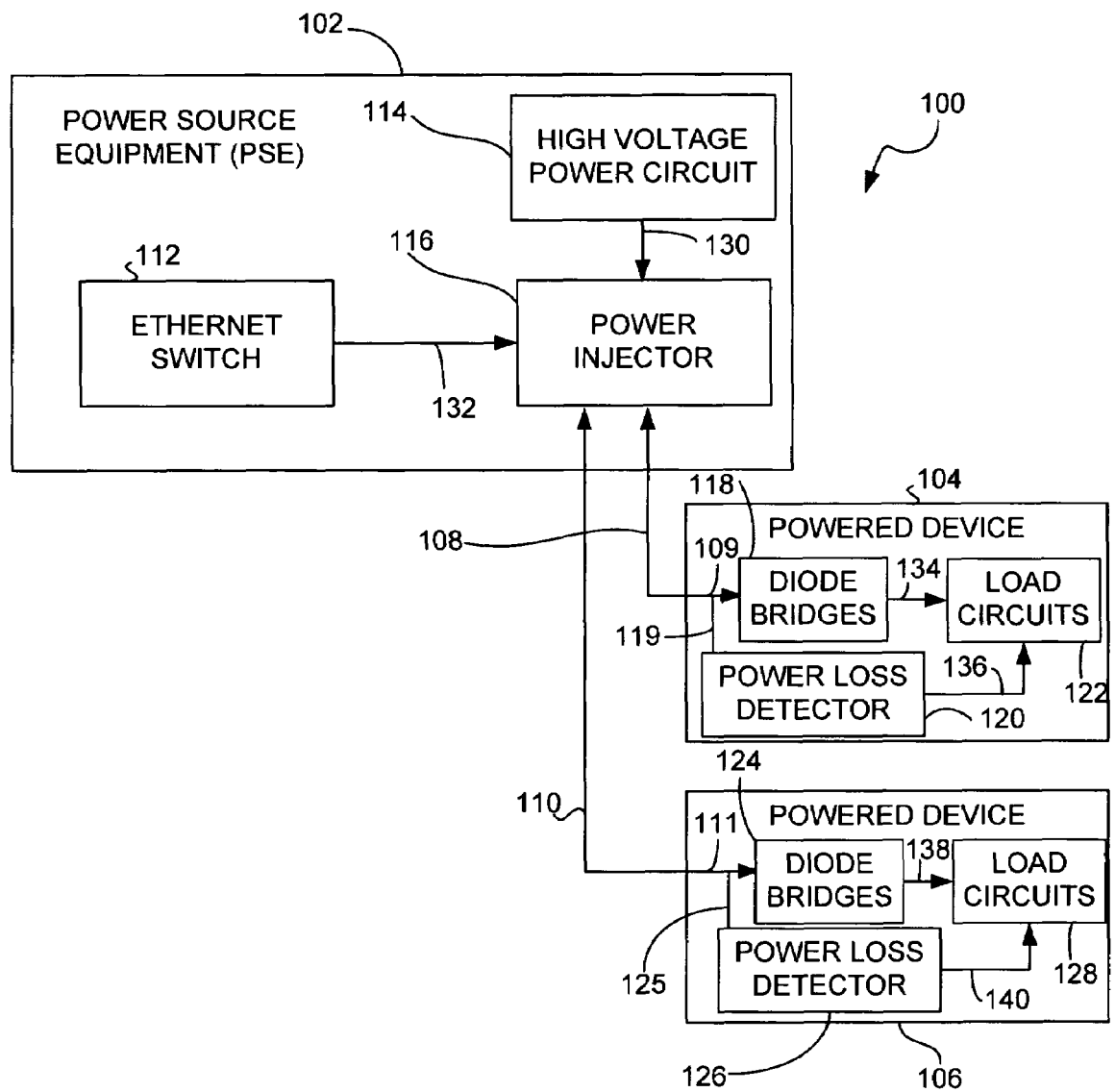
FIG. 1 is a block diagram of a particular embodiment illustrating a Power over Ethernet (PoE) system including powered devices with power loss detection.

FIG. 1 is a block diagram of a particular embodiment illustrating a Power over Ethernet (PoE) system 100 including power sourcing equipment (PSE) 102 that is communicatively coupled to powered devices (PDs) 104 and 106 via twisted pair cables 108 and 110, respectively. The PSE 102 includes an Ethernet switch 112, a high voltage power circuit 114, and a power injector 116. The PD 104 includes an input 109, diode bridges 118, a power loss detector 120, and load circuits 122. The PD 106 includes an input 111, diode bridges 124, a power loss detector 126, and load circuits 128. In addition, the system 100 may also include network devices (not shown) that are not adapted for PoE and that draw power from a separate power supply, such as an electrical wall plug.

The high voltage power circuit 114 provides a supply voltage to the power injector 116 via line 130. The power injector 116 receives Ethernet signals from the Ethernet switch 112 via line 132 and places the Ethernet signals and at least a portion of the supply voltage onto the twisted pair cables 108 and 110. While only two PDs 104 and 106 are shown, it should be understood that the PSE 102 can provide power to a number of PDs, depending on the specific implementation of the PSE 102 and depending on the specific power requirements of the attached PDs.

In general, in many applications, such as telephony and PoE, due to wiring uncertainties, the polarity of the input supply voltage at the PD 104 or 106 cannot be guaranteed. Therefore, the diode bridges 118 and 124 provide that the correct voltage polarity is applied to load electronics within the PDs 104 and 106, to electronic devices attached to the PDs 104 and 106, or any combination thereof. Moreover, since twisted pair cables 108 and 110 include multiple wire pairs and since it may not be known which of the wire pairs carries the power supply, multiple diode bridges 118 and 124 may be provided to account for the various implementations.

In general, the PoE standard specifies that power may be provided over a pair of twisted pair wires of an Ethernet cable, such as a CAT5 cable, that also carries data. Alternatively, power may be provided over spare wire pairs of the Ethernet cable.

In operation, the PSE 102 provides power and data over a pair of wires of the twisted pair cables 108 and 110 to the inputs 109 and 111 of the PDs 104 and 106, respectively. The diode bridges 118 include an input 109 to receive a power supply input from the PSE 102 via the cable 108. The diode bridges 118 produce a rectified power supply via line 134 to the load circuits 122 based on the input power supply voltage. It should be understood that line 134 is provided for illustrative purposes only. Line 134 may represent both positive and negative power supply terminals, such as power supply voltage terminals 244 and 246 in FIG. 2.

In parallel with the production of the rectified power supply, the power loss detector 120 has an input 119 that is responsive to the input 109. The power loss detector 120 is adapted to detect a power loss event and to initiate a power shutdown. For example, the power loss detector 120 may generate a power loss indication to the load circuits 122 via line 136 when the input voltage level on the input 109 falls below a threshold voltage level.

Additionally, the diode bridges 124 include an input 111 to receive a power supply input from at least two wires within the twisted pair cable 110. The diode bridges 124 produce a rectified power supply via line 138 to the load circuits 128 based on the input power supply voltage. In parallel with the production of the rectified power supply, the power loss detector 126 includes an input 125 that is responsive to the power supply input at input 111. The power loss detector 126 is adapted to detect a power loss event and to initiate a power shutdown. For example, the power loss detector 126 may generate a power loss indication to the load circuits 128 via line 138 when the input voltage level on the input 111 falls below a power-off threshold voltage level.

A power loss indication, such as that generated by the power loss detectors 120 and 126, may include a shutdown signal via lines 136 and 140 to initiate a controlled shutdown of load circuitry 122 and 128, for example. Alternatively, a power loss indication may include a signal to initiate back up operations, such as data storage, state storage, and the like. The load circuitry 122 and 128 may perform the operations in response to the power loss indication. In yet another embodiment, a power loss indication may be utilized by other logic to switch between power supplies, such as between a power supply from an Ethernet cable to a battery backup, for example.

In general, the term "powered device" and "PD," as used herein, refers to a device adapted to receive a power supply and to receive data from the same cable or wiring. In the embodiment shown, the PDs 104 and 106 are adapted to operate within a PoE environment. Alternatively, the power sourcing equipment (PSE) 102 may be any source adapted to transmit power and data over common wiring. For example, the PSE 102 may be an electrical power transmission station adapted for high-speed broadband data transmissions over electrical transmission lines. In such an instance, the data transmissions may use data packets, data frames, other data protocols, or any combination thereof. Nevertheless, the PDs 104 and 106 may be adapted to communicate using an appropriate protocol.

Figure 2:
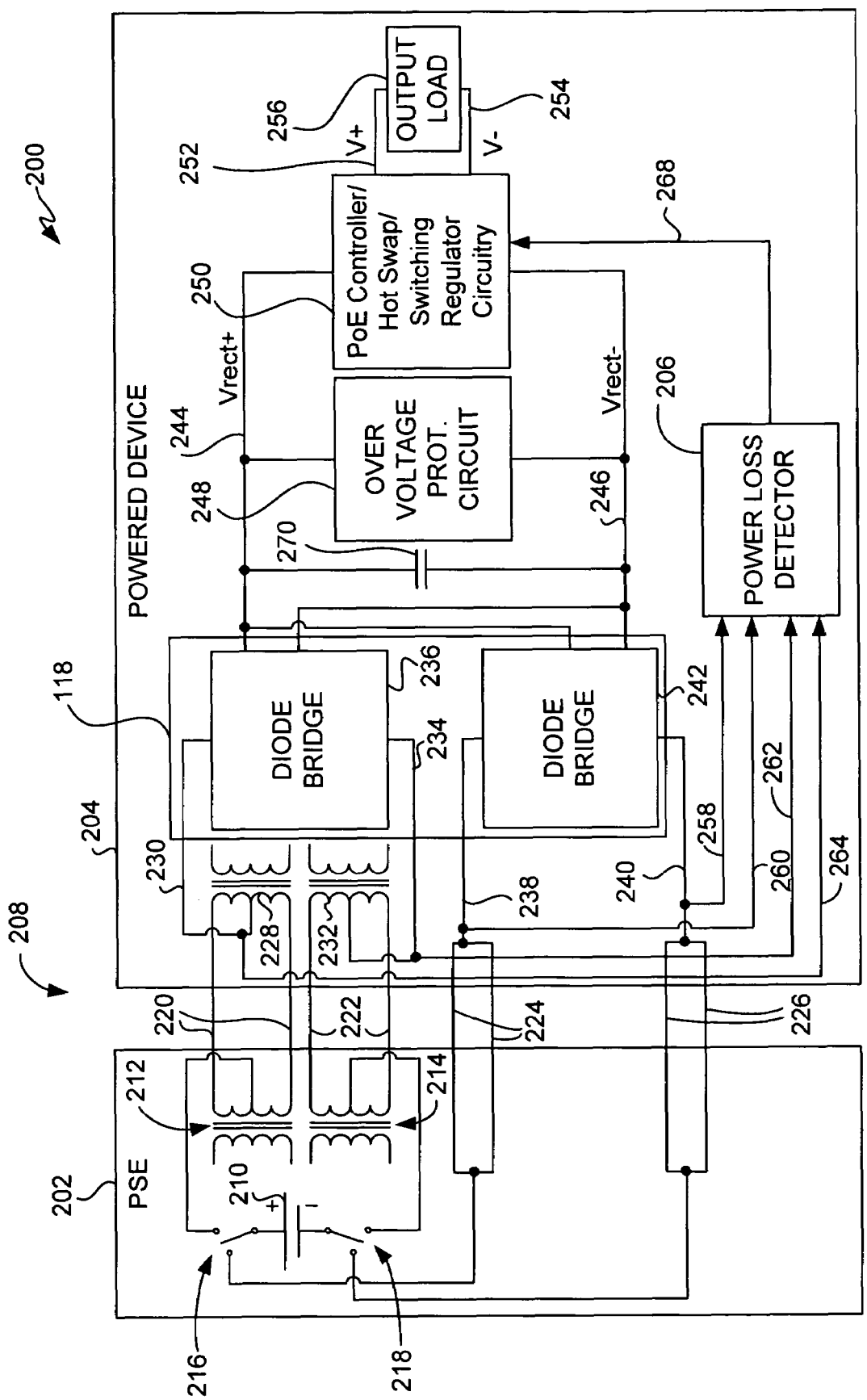
FIG. 2 is a general diagram illustrating PoE wiring interconnections in a particular PoE enabled system including power source equipment and a powered device (PD) with a power loss detector.

FIG. 2 is a general diagram illustrating PoE wiring interconnections in a particular PoE enabled system 200. The PoE enabled system 200 includes power sourcing equipment (PSE) 202 that is coupled to a PD 204 having a power loss detector 206 via twisted pair cable 208. The PSE 202 includes a power source 210 and isolating transformers 212 and 214, which may be coupled to the power source 210 through switches 216 and 218. The PSE 202 is connected to the PD 204 via the Ethernet cable 208, which may include multiple wire pairs, such as wire pairs 220 and 222, 224, and 226. The IEEE Std 802.3™-2005 standard defines a role for each of the wire pairs 220, 222, and wire pairs 224 and 226 within the twisted pair cable 208. Two of the wire pairs 220 and 222 carry Ethernet packets, and two of the wire pairs 224 and 226 may be a spare set of wires. As shown, the switches 216 and 218 may connect the power supply 210 to wire pairs 220 and 222 via isolating transformers 212 and 214. Alternatively, the switches 216 and 218 may connect the power supply 210 to the wire pairs 224 and 226.

The PD 204 includes transformers 228 and 232 and diode bridges 118, which include a diode bridge 236 and a diode bridge 242. The PD 204 also includes a power loss detector 206, an over-voltage protection circuit 248, and a PoE controller/hot swap/switching regulator circuit 250, which provides a regulated power supply to an output load 256. The diode bridge 236 includes two inputs 230 and 234 coupled to respective center taps of transformers 228 and 232. The diode bridge 242 includes inputs 238 and 240, which are coupled to the spare wire pairs 224 and 226, respectively. The diode bridges 236 and 242 include outputs to provide a rectified power supply ($V_{rect}+$ and $V_{rect}-$) to voltage supply terminals 244 and 246. The capacitor 270 is an input filter that is coupled between the voltage supply terminals 244 and 246 to filter the rectified power supply, providing a relatively smooth DC supply voltage. The over voltage protection circuit 248 and the PoE controller/hot swap/switching regulator circuitry 250 may be coupled between the voltage supply terminals 244 and 246. The PoE controller/hot swap/switching regulator circuitry 250 also includes outputs terminals 252 and 254 coupled to the output load 256. The power loss detector 206 includes inputs 258, 260, 262, and 264 coupled to the inputs 230, 234, 238, and 240 of the diode bridges 236 and 242. The power loss detector 206 also includes an output 268, which may be coupled to the PoE controller/hot swap/switching regulator circuitry 250.

In operation, the PSE 202 provides power to the PD 204 via the Ethernet cable 208. When the switches 216 and 218 are in a first position, the power supply 210 is delivered to a center tap of the transformers 204 and 206 to place power onto the wire pairs 220 and 222 of the twisted pair cable 208. The wire pairs 220 and 222 may carry power, data, or any combination thereof. When the switches 216 and 218 are in a second position, the power supply 210 provides power to the spare wire pairs 224 and 226. The input power supply from the Ethernet cable 208 is either received at the transformers 228 and 232 or at the input terminals 238 and 240. Generally, if the input power supply is received at transformer 228 and/or at transformer 232, then the power is provided by the PSE 202 via the signal pair of wires 220 and 222. If the input power supply is provided by the PSE 202 over the spare wire pair 224 and 226, the power supply may be used for devices that do not support 1000 BASE-T or Gigabit Ethernet. In either case, one of the diode bridges 236 or 242 rectifies the input power supply to provide a rectified power supply voltage ($V_{rect}+$ and $V_{rect}-$) on voltage supply terminals 244 and 246.

In parallel with the rectification process, the power loss detector 206 monitors the input power supply voltage level on each of the inputs 230, 234, 238 and 240 in front of the diode bridges 236 and 242 via inputs 258, 260, 262 and 264. The power loss detector takes advantage of a blocking characteristic of the diode bridges 236 and 242 to detect a power loss event before the power loss event is reflected by a voltage level of the rectified power supply voltage. By detecting a power loss event at the inputs to the diode bridges 236 and 242, the power loss event is detected by the power loss detector 206 before the rectified and filtered supply voltage on the voltage supply terminals 244 and 246 begins to discharge.

In a particular embodiment, the power loss detector 206 takes advantage of a blocking characteristic of the diode bridges 236 and 242 to detect a power loss event to provide a power loss indication. In particular, during normal operation, the filter capacitor 270 is charged at an operating voltage level. When a power loss event occurs (such as when the PoE device is disconnected from the Ethernet cable 208, when a power failure event occurs, and so on), the diode bridges 236 and 242 prevent discharge of the capacitor 270 via the Ethernet cable 208. Accordingly, the capacitor 270 discharges through the load circuit 256 and through the PoE controller/hot swap/switching regulator 250. Since most PoE enabled devices include diode bridges to provide polarity independence, this blocking characteristic may occur in most PoE enabled devices, such as PD 204. The power loss detector 206 takes advantage of the blocking characteristic of the diode bridges 236 and 242 to provide a concurrent or parallel detection of a power loss event, before discharge voltage from the input filter capacitor 270 has begun to fall off or sag. Accordingly, the capacitive charge of the filter capacitor 270 provides sufficient power to sustain a controlled shutdown operation upon detection of the power loss event by the power loss detector 206.

Integration of the diode bridges 236 and 242 on an integrated circuit together with the power loss detector and other associated circuitry, such as the load circuit 256, allows for detection of the input power supply voltage, at input pins of the integrated circuit substrate for example. By monitoring the power supply input at the inputs to the diode bridges 236 and 242, the power loss detector 206 may detect a power loss event concurrently with the rectification process. Moreover, due to the blocking characteristics of the diode bridges 236 and 242 preventing current flow onto the cable 208 and due to the capacitive discharge of the capacitor 270, the power loss detector 206 may be able to detect a power loss event before the event is reflected in the rectified and filtered power supply voltage on the terminals 244 and 246. In one particular embodiment, the power loss detector may detect a power loss event before a fall off in the voltage level of the filtered power supply voltage can be detected as compared to a fluctuation in an input power supply voltage. Thus, the power loss detector 206 provides improved power loss event detection to initiate a controlled shutdown to protect circuit elements and to preserve data.

It should be understood that in 1000BASE-T implementations, each of the wire pairs of the cable 208 may carry data. In such an implementation, the wire pairs 224 and 226 may also be coupled to center tapped transformers within the PSE 202 and the PD 204.

Figure 3:
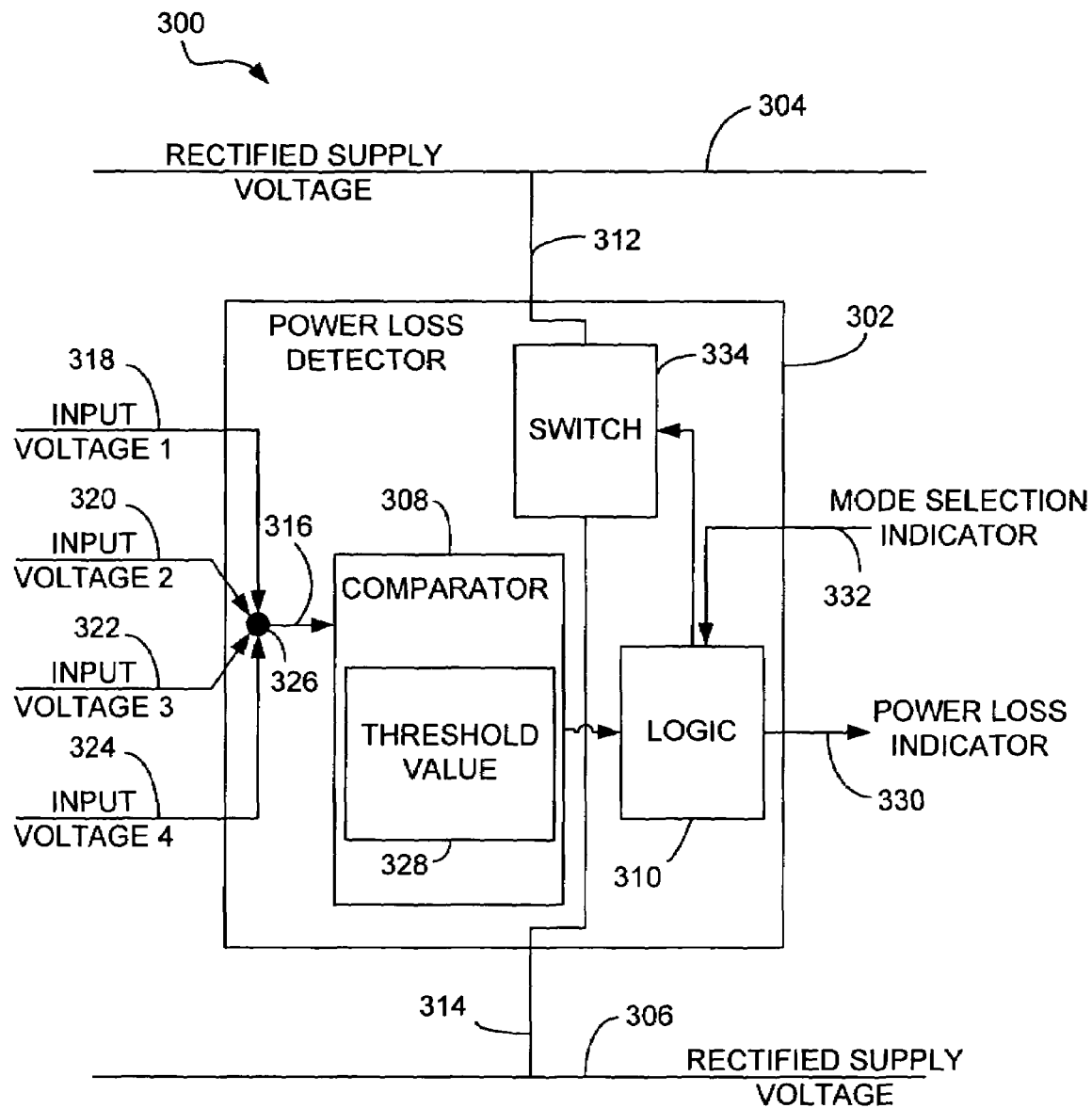
FIG. 3 is a block diagram illustrating a particular embodiment of a power loss detector.

FIG. 3 is a general diagram illustrating a particular embodiment of a system 300 including a power loss detector 302. The power loss detector 302 includes a comparator 308 and logic 310 and is coupled to voltage supply terminals 304 and 306 via lines 312 and 314. The power loss detector 302 includes inputs 318, 320, 322 and 324, which are connected to the comparator 308 via a node 326 and line 316. The comparator 308 may include a threshold value 328. The logic 310 may receive a mode selection input 332 and may provide a power loss indicator output 330. Additionally, the power loss detector 302 may include a switch 334, which is coupled between the voltage supply terminals 304 and 306 via lines 312 and 314 and which is adapted to receive a control signal from the logic 310.

In operation, the power loss detector 302 receives voltage supply inputs at its inputs 318, 320, 322, and 324. The voltage supply inputs 318, 320, 322 and 324 are provided to the comparator 308 via line 316 and node 326. The comparator 308 monitors the voltage supply input at node 326 and compares the voltage supply input to the threshold value 328 to generate an output to logic 310. The logic 310 may generate a power loss indication via the power loss indicator output 330, depending on an operational mode specified by a mode selection indicator via mode selection input 332. For example, if the device including the logic 310 receives an initialization mode indicator from logic (such as logic 482 in FIG. 4) via the mode selection input 332, the logic 302 may ignore a signal indicative of a power loss event from the comparator 308. By contrast, if the device including the logic 310 receives a thermal shutdown indicator from a thermal sensor (such as thermal sensor 480 in FIG. 4) via the mode selection input 332, the logic 310 may generate a power loss indication via the power loss indicator output 330 to initiate a shutdown operation with respect to associated load circuitry, independent of the output of the comparator 308.

In one particular embodiment, the logic 310 may provide a power loss control signal to the switch 334. The switch 334 may be adapted to shunt a power supply voltage from the voltage supply terminal 304 to the voltage supply terminal 306 to generate a step-like voltage signal on the voltage supply terminals 304 and 306, which may be readily detected as a power loss indication by associated circuitry. In this instance, the switch may shunt the power supply voltage through, for example, a resistor (not shown).

Figure 4:
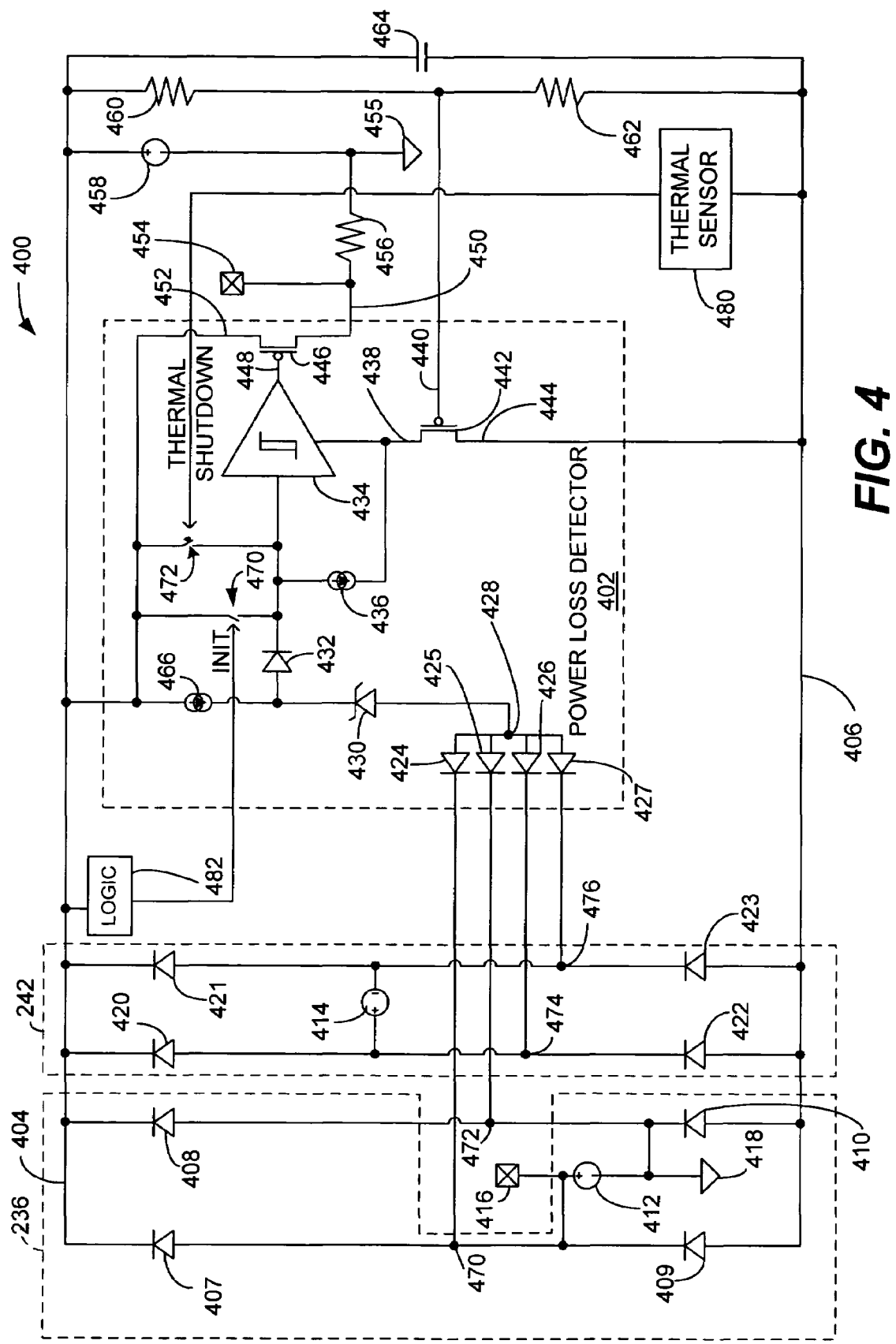
FIG. 4 is a schematic diagram illustrating a particular embodiment of a powered device including power loss detection.

FIG. 4 is a schematic diagram illustrating a particular embodiment of a portion 400 of a PD including a power loss detector 402. The portion 400 includes power supply voltage terminals 404 and 406, and diodes 407, 408, 409 and 410. The diodes 407, 408, 409 and 410 define a diode bridge (such as diode bridge 236 in FIG. 2). The diodes 407 and 409 are connected in series between the supply voltage terminals 404 and 406. The diodes 408 and 410 are also connected in series between the supply voltage terminals 404 and 406. An input voltage of the diode bridge 236 is indicated by a voltage supply 412. The diode bridge 236 may also include a pin 416 for connection to another circuit and may include a ground connection 418.

The portion 400 also includes diodes 420, 421, 422 and 423 arranged to form a diode bridge (such as diode bridge 242 in FIG. 2). The diodes 420 and 422 are connected in series between the supply voltage terminals 404 and 406. The diodes 421 and 423 are also connected in series between the supply voltage terminals 404 and 406. An input power supply voltage of the diode bridge 242 is indicated by a voltage supply 414.

The portion 400 also includes a pin 454 coupled to an output 450 of the power loss detector 402. The output 450 is coupled to a ground terminal 455 via resistor 456. The portion 400 may also include, a bias voltage 458, matched resistors 460 and 462, and an input filter capacitor 464.

The power loss detector 402 includes blocking diodes 424, 425, 426, and 427, a node 428, a zener diode 430, a diode 432, a comparator 434, a bias current 436, a transistor 442 with a control input 440, and terminals 438 and 444. The power loss detector 402 also includes a transistor 446 with a control input 448, and terminals 450 and 452. The power loss detector 402 may also include a switch 470 and a switch 472. The transistors 442 may be a n-channel transistor, and the transistor 446 may be a p-channel transistor.

In general, the bias currents 466 and 436 are provided to maintain the power loss detector 402 in an active state. Resistors 460 and 462 are matched, such that the gate terminal 440 of transistor 442 is held active at a midpoint voltage level of the voltage differential between the voltage supply terminals 404 and 406 to provide a current path for current flow from the bias currents 466 and 436 through transistor 442 to the voltage supply terminal 406. Additionally, the transistor 442 provides a voltage supply approximately 5 volts below the voltage level of the voltage supply terminal 404.

During operation, an input supply voltage is received at a power supply input of one of the diode bridges 236 or 242 (such as indicated by voltage supplies 412 and 414). The input supply voltage is rectified by diodes 407, 408, 409 and 410 or by diodes 420, 421, 422, and 423, and the rectified supply voltage is provided to power supply terminals 404 and 406. The rectified supply voltage charges the input filter capacitor 464, which filters the rectified supply voltage to provide a filtered DC supply voltage, which may be used to provide power to load circuitry, such as load circuit 256 in FIG. 2.

The blocking (steering) diodes 424, 425, 426 and 427 transfer the input port voltages at nodes 470, 472, 474 and 476 to node 428. In general, the zener diode 430 shifts a voltage level of the input port voltage at node 428 and sets a threshold voltage level at the input of the comparator 434. In one particular embodiment, the zener diode 430 may have a breakdown voltage threshold of 28 volts, such that if the input port voltage at node 428 is at a voltage differential relative to the voltage supply terminal 404 that is less than 28 volts (corresponding to the breakdown voltage of the zener diode 430), the voltage level at the input of the comparator is pulled high and the output 448 of the comparator 434 turns off the transistor 446, which pulls the power loss output at pin 454 to a logic low level. When a voltage differential between the node 428 and the voltage supply terminal 404 is greater than the breakdown voltage threshold, the voltage level at the input of the comparator 434 is pulled down and the output 448 of the comparator 434 turns on the transistor 446, which drives power to the power loss pin 454 to hold the power loss pin 454 at a logic high level. A logic low level may be indicative of a power loss event at the input ports 412 and 414.

In general, the zener diode 430 is selected to have a breakdown characteristic that corresponds to a voltage level that is below the operating range of the powered device. When the powered device receives an input power supply in an operating range, such as between 33 and 57 volts for a PoE enabled device, the zener diode 430 is reverse biased, which reverse biases the diode 432, pulling a voltage level at the input of the comparator 434 low. When the input power supply falls below the breakdown voltage level, such as below 28 volts in one particular embodiment, the zener diode 430 stops conducting current, and the diode 432 is forward biased, allowing the bias current 466 to pull the voltage level at the input of the comparator 434 high. In a PoE device with an operating range of 33 to 57 volts, a 28-volt breakdown characteristic of the zener diode 430 allows for approximately a 5 volt margin of error, which protects against false positives in terms of power loss event detection. If desired, a zener diode having a different breakdown characteristic may be selected to provide a smaller or a larger margin between the breakdown voltage and the operating voltage range. Additionally, rather than using a single zener diode 430, as shown, the breakdown characteristic may be achieved using a diode circuit including multiple zener diodes, multiple standard diodes, or any combination thereof arranged in series, such that the sum of the breakdown characteristics of each of the multiple diodes defines the threshold voltage at which a power loss event is detected.

By transferring the input port voltages at nodes 470, 472, 474 and 476 to node 428, the power loss detector 402 bypasses the capacitance of the filter capacitor 464, allowing for the power loss detector 402 to detect a power loss event and to initiate power shutdown operation, such as a controlled shutdown of associated circuitry, before the capacitor 464 voltage level begins to sag. Thus, a power shutdown process may be initiated using the input filter capacitor 464 to supply the requisite power to perform the operation, when the power supply at the inputs 412 and 414 is removed and while the input filter capacitor 464 is discharging through an associated load circuit, such as the load 256 in FIG. 2.

In one particular embodiment, a voltage level of the voltage supply terminal 404 is approximately zero volts, and the voltage level of the voltage supply terminal 406 is a negative voltage. The voltage at node 428 is approximately 1 diode drop above the negative supply voltage level. The voltage differential between the voltage supply terminal 404 (zero volts) and the voltage at node 428 is greater than the breakdown voltage of the zener diode 430, reverse biasing the zener diode 430 and allowing current to flow through the zener diode 430. When the power supply is cut off, the voltage at node 428 increases to approximately zero volts, deactivating the zener diode 430. Current that previously flowed through the zener diode 430, such as a portion of the bias current 466, flows through the diode 432. The voltage level at the input to the comparator 434 is increased, causing the output of the comparator 434 to increase, shutting off the transistor 448 and pulling the output on the pin 454 to a logic low level.

In one particular embodiment, the portion 400 includes a thermal sensor 480 to detect a temperature of the circuit. If the circuit becomes too hot, the thermal sensor 480 generates a thermal shutdown signal, which activates the switch.472, pulling the comparator output 448 to a logic high level, which generates a power loss indication at the pin 454. In another particular embodiment, the portion 400 includes logic 482 to selectively activate and deactivate the power loss detector 402 via switch 470 during initialization. For example, during a detection phase when the PSE applies test voltages to the input port 412 or 414 at a voltage level between 2.8 and 10 volts, and during the period when power has been received at the input ports 412 and 414 and while the input filter capacitor 464 is still charging, the output of the pin 454 is held at a logic high level by the logic 482 via switch 470. During a detection process (where power sourcing equipment applies a voltage to a network node and monitors the node to detect a resistance within a predetermined range which indicates the presence of a PoE enabled device), the initialization (INIT) signal causes the comparator to shut off the power loss signal, which generates a logic low level on output pin 454.

In one particular embodiment, the resistors 460 and 462 may be 100 K-ohm resistors, and the bias voltage supply 458 may be approximately 3.3 volts. The input filter capacitor 464 may be 120 nF, and the zener diode 430 may be a 28-volt zener diode.

Figure 5:
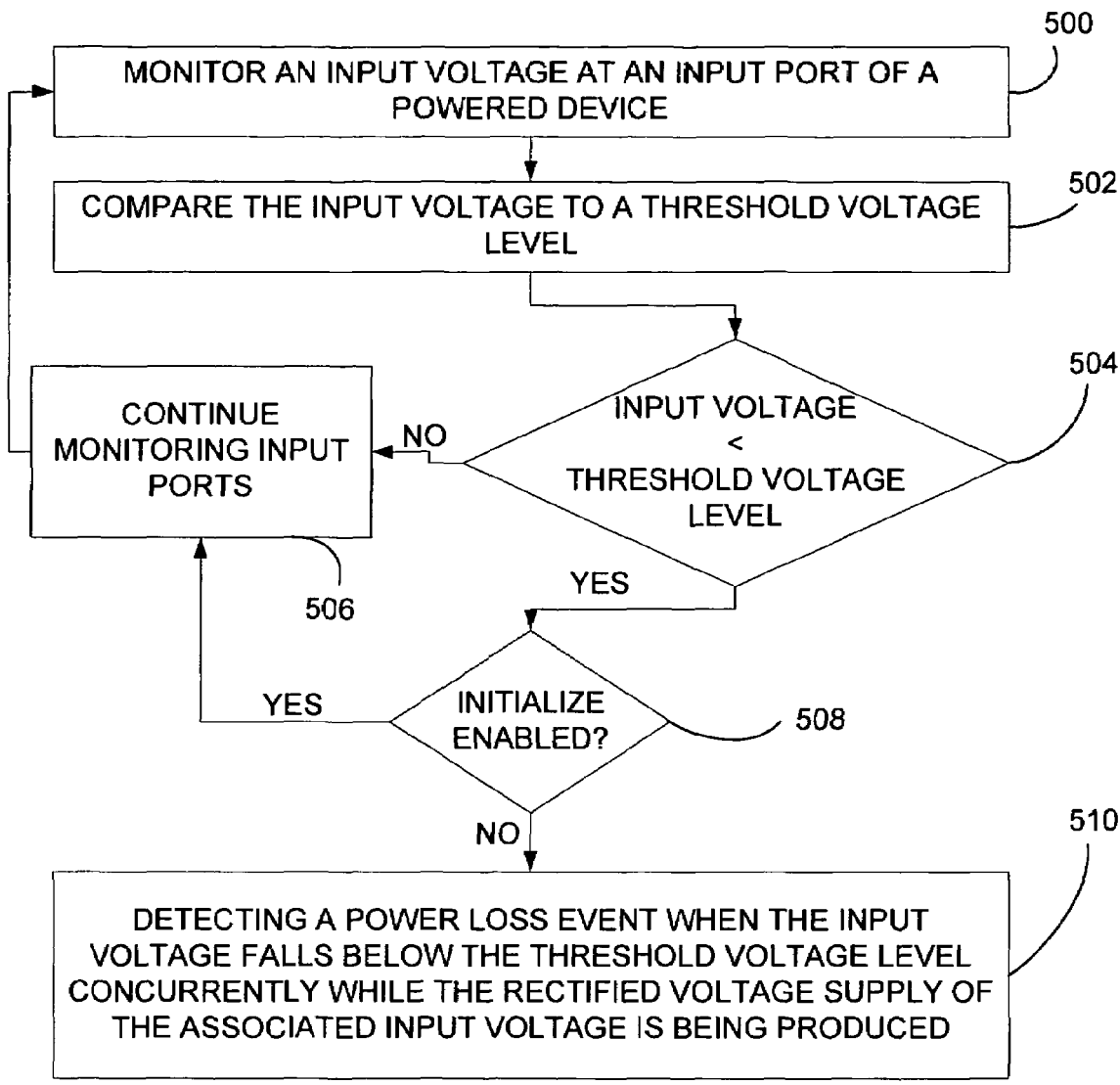
FIG. 5 is a flow diagram illustrating a particular method of performing power loss detection.

FIG. 5 is a flow diagram illustrating a particular method of performing power loss detection. An input voltage at an input port of a PD is monitored (block 500). The input voltage is compared to a threshold voltage level (block 502). For example, a comparator may be used to determine if the input voltage is less than the threshold voltage level (block 504). If the input voltage is greater than the threshold level, the device continues to monitor the input ports (block 506). If the input voltage is less than the threshold level, the state of the device may be checked. For example, if the initialize mode is enabled (block 508), the device continues to monitor the input ports (block 506). If the initialize mode is not enabled, a power loss event is detected when the input voltage falls below the threshold voltage level concurrently while the rectified voltage supply of the associated input voltage is being produced (block 510).

It should be appreciated that block 508 may be optional. Additionally, the flow diagram may include other blocks to test for other modes. For example, power loss event may be detected before a rectified voltage level falls below the threshold level. In a particular embodiment, logic may be used to determine if a thermal event has been detected and to generate the power loss indication in response to either detection of a power loss event or detection of the thermal event.

Figure 6:
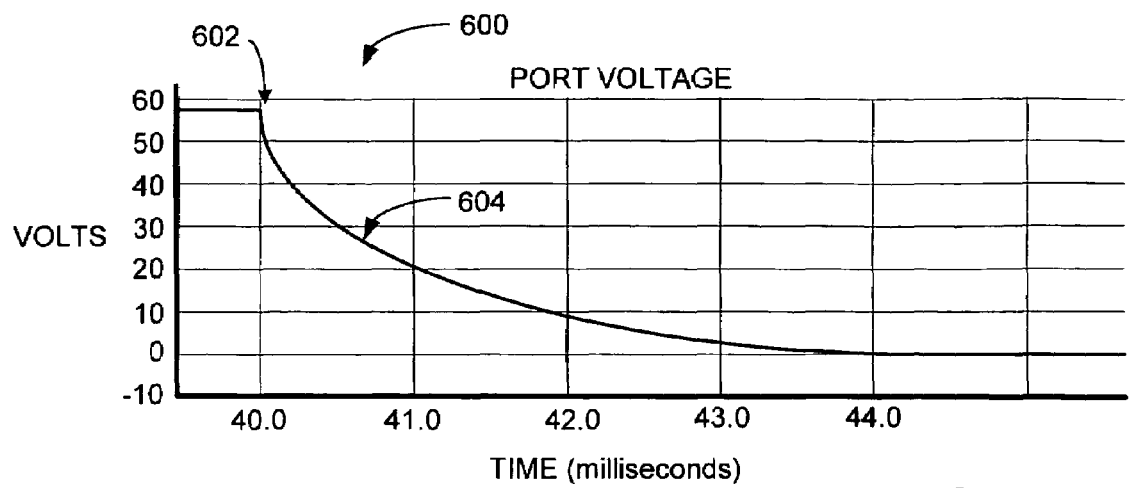
FIG. 6 is a graph illustrating an input port voltage level over time during a power loss event for a particular embodiment of a powered device with power loss detection.

FIG. 6 is a graph 600 illustrating an input port voltage level (such as at the inputs to the diode bridges 236 and 242, as indicated by voltage supplies 412 and 414 in FIG. 4) over time during a power loss event for a particular embodiment of a PD with power loss detection. In this particular embodiment, a power loss event occurs when a power supply voltage at the input ports of the diode bridges falls below 28 volts. At a time less than 40 milliseconds, the input port voltage is approximately 57 volts. At 602, the input port voltage begins to exponentially decay from 57 volts to zero volts at 44 milliseconds. The input port voltage shown in graph 600 exhibits an exponential decay, which may be caused by filter capacitances of the PSE (such as PSE 102 in FIG. 1), parasitic capacitances of the cabling, and the like. At about 40.7 milliseconds, the input port voltage falls below a threshold, such as 28 volts (as indicated at 604). In this instance, a power loss event occurs when the input port voltage falls below the threshold (e.g. 28 volts). It should be understood that the threshold voltage level may vary, depending on the implementation. A 28-volt threshold is described herein for illustrative purposes only.

Figure 7:
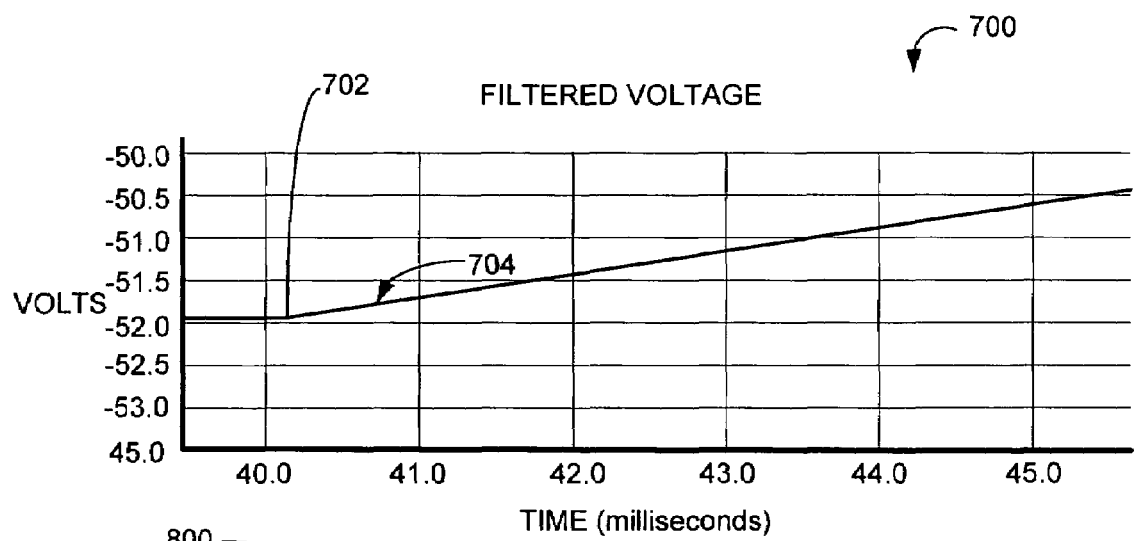
FIG. 7 is a graph illustrating a filtered voltage level over time during a power loss event for a particular embodiment of a powered device.

FIG. 7 is a graph 700 illustrating a filtered voltage level over time during a power loss event for a particular embodiment of a PD with power loss detection. The filtered voltage level corresponds to the voltage level on voltage supply terminals 404 and 406 of the diode bridges 236 and 242 in FIGS. 2 and 4, for example. An input voltage is received and rectified by the diode bridges and filtered by the input filter capacitor 464. At a time of 40 milliseconds (as indicated by point 602 in FIG. 6), the power supply voltage begins to decrease, and shortly thereafter at approximately 40.2 seconds (at reference numeral 702), the filtered voltage begins to increase. It should be understood that it is often desirable to operate in a negative voltage range for low power circuits, and that a power loss event in such a circuit may be reflected as an increase toward a zero voltage from a negative voltage level. At 704 corresponding to approximately 40.7 milliseconds when the port voltage at 604 in FIG. 6 falls below a threshold, such as 28 volts, the filtered voltage has only increased from about −51.9 volts to −51.65 volts. Thus, the power loss event is not yet visible to the load circuitry.

It should be understood that the negative voltage levels are indicated because of the particular arrangement of the diodes 424, 425, 426 and 427 in FIG. 4. However, in a similar circuit, the diodes 424, 425, 426, and 427 of FIG. 4 may be connected to the positive supply, and the filtered voltage level would then be indicated to be positive. In such an instance, in the example above, the voltage level of the rectified voltage would be shown to decrease from 51.9 to 51.65 volts.

In a PoE device, the operating voltage is typically within a range of −36 to −57 volts or 36 to 57 volts. In this instance, the filtered voltage supply of −51.65 volts is well within the operating voltage range of the device. Thus, the PoE device may utilize the filtered voltage supply to perform various operations, including a shutdown operation. It should be understood that particular embodiments of PoE devices may be adapted to operate outside of the range of 36 to 57 volts to allow a margin for the operating supply voltage.

Figure 8:
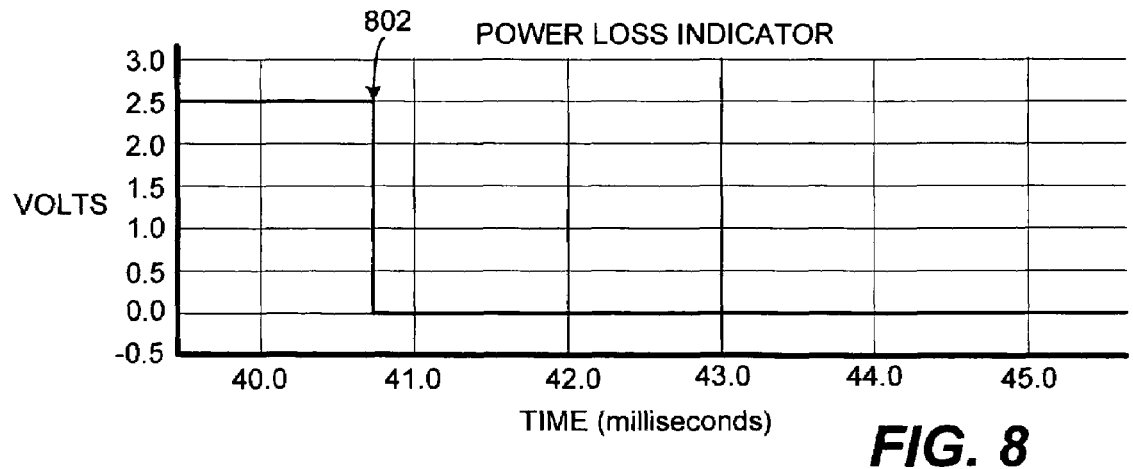
FIG. 8 is a graph illustrating a power loss indicator over time during a power loss event for a particular embodiment of a powered device with power loss detection.

FIG. 8 is a graph 800 illustrating a power loss indicator over time during a power loss event for a particular embodiment of a PD with power loss detection at the power loss pin 454 in FIG. 4, for example. In response to detection of a power loss event at 40.7 milliseconds when the input port voltage at 604 in FIG. 6 falls below 28 volts, the power loss indicator is changed from a logic high level of 2.5 volts to a logic low level of zero volts at 802. In particular, the power loss indicator changes when the input port voltage falls below a threshold level, such as 28 volts.

At this point, indicated at 802 in FIG. 8, the power loss detector detects the power level of the input port voltage falling below the illustrative threshold of 28 volts and generates the power loss indication, before the filtered voltage (shown in FIG. 7) falls below an operating voltage level, such as 33 volts in a particular PoE implementation. By detecting a power loss event at the input port voltage, the power loss detector can initiate a shutdown operation to power off associated load circuitry before the filtered supply voltage falls below the operating voltage range.

It should be understood that the voltage levels are provided for illustrative purposes only, and that the logic high and logic low levels may vary from that shown depending on the specific implementation. Additionally, it should be understood that the threshold level for power loss detection may be adjusted depending on the particular implementation. For example, the threshold voltage level may be increased from 28 volts to 30 volts, to detect a power loss event even sooner to provide more time for a power shutdown operation while the input filter capacitor, such as capacitor 464 in FIG. 4) is still fully charged. However, if the low end of the range of operating voltages and the threshold voltage level are too close together, then the potential for false power loss detections is increased. Additionally, while this implementation has been described with respect to PoE devices, it should be understood that the power loss detector may be utilized in other circuits where power loss detection is desirable.

Figure 9:
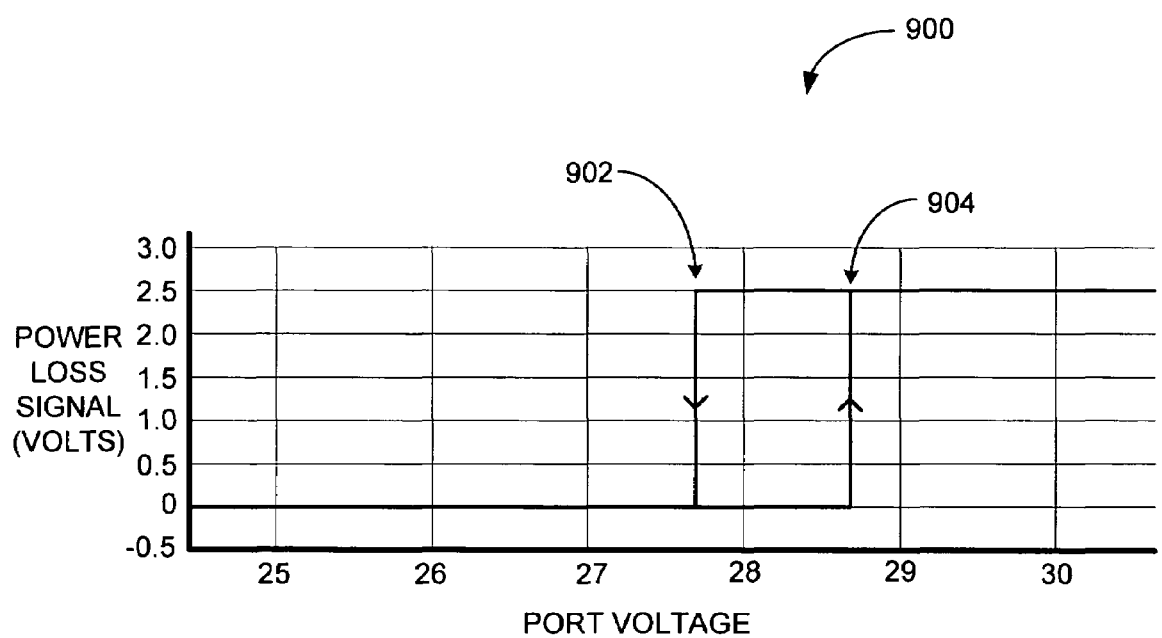
FIG. 9 is a graph illustrating a power loss signal relative to an input port voltage for both a power on threshold and a power off threshold input port voltage level.

FIG. 9 is a graph 900 illustrating a power loss signal in volts relative to an input port voltage for both a power on threshold and a power off threshold input port voltage level. As shown, the power loss signal is pulled to zero, at 902, when the input port voltage falls below the illustrative threshold of 28 volts, and is pulled to a logic high level of 2.5 volts at 904 when the input port voltage increases above the threshold. In this particular instance, the comparator exhibits a hysteresis of approximately 1 volt, which provides a buffer to prevent false positive power loss event detection in response to power supply glitches.

While the above description has focused on power loss detection, the comparator may also be used to turn on the associated circuitry. Once the power level increases above 28 volts and after initialization is complete, the voltage level of the pin 454 in FIG. 4 may be driven to a logic high level. Thus, the comparator 434 may introduce a 1-volt hysteresis to prevent false power loss event detection.

In general, though the embodiments described above have focused largely on PoE implementations, it should be understood that the power loss detector, such as that described above with respect to FIGS. 1-9, may be utilized in other applications where a controlled shutdown in response to a power loss is desired. Moreover, the above-described embodiments may be employed with other types of powered networks, where the power supply voltage cabling also carries data. For example, the power supply and data may be received from a bus including power and data. Alternatively, the power supply may be derived from electrical power lines that also carry data transmissions. In general, a PD may be adapted to derive power and to receive data from the same wire, wire pair, or alternative communication link, regardless of the network type. The power loss detector is adapted to detect power loss from any type of powered network.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A powered device comprising:
    at least one power supply input responsive to an external power source;
    a diode bridge having an input to receive the at least one power supply input; and
    a power loss detector having an input responsive to the at least one power supply input, the power loss detector to detect a power loss event, and to initiate a power shutdown to turn off power to at least one circuit coupled to the diode bridge in response to detection of the power loss event, the power loss detector comprising:
        at least one blocking diode responsive to the at least one power supply input;
        a zener diode circuit including an input coupled to the at least one blocking diode and including an output, the zener diode circuit having a breakdown voltage characteristic that defines a voltage level related to the power loss event; and
        a comparator coupled to the output of the zener diode circuit, the comparator to generate an output signal related to a voltage level of the at least one power supply input.

2. The powered device of claim 1, further comprising a load circuit to receive a power supply voltage from the diode bridge, the load circuit responsive to the power loss detector, the load circuit to perform a shutdown operation after the power loss detector initiates the power shutdown.

3. The powered device of claim 1, wherein the power loss detector generates a power loss indicator in response to detection of the power loss event.

4. The powered device of claim 1, wherein the powered device comprises an integrated circuit.

5. The powered device of claim 1, wherein the external power source comprises power source equipment coupled to the at least one power supply input via an Ethernet cable.

6. The powered device of claim 1, wherein the zener diode circuit comprises a plurality of zener diodes in series, wherein the breakdown voltage characteristic includes a sum of breakdown voltage characteristics of each of the plurality of zener diodes.

7. The powered device of claim 1, wherein the power loss detector comprises:

a thermal input to receive a signal related to a thermal event, wherein the power loss detector initiates the power shutdown in response to the signal related to the thermal event.

8. The powered device of claim 1, wherein the power loss detector comprises:

an initialization input to receive a signal related to an initialization mode, the initialization input to selectively disable the power loss detector based on the initialization mode.

9. A powered device coupled to a network to receive power and data from the network via a cable, the powered device comprising:

at least one power supply input responsive to a wire of the cable, the cable to provide data and power;

a first supply terminal and a second supply terminal;

a diode bridge having an input to receive the at least one power supply input and having an output to provide a rectified supply voltage to the first and the second supply terminals;

an input filter capacitor coupled between the first supply terminal and the second supply terminal; and a power loss detector having an input responsive to the at least one power supply input, the power loss detector to detect a power loss event and to automatically initiate a power shutdown when a voltage level of the at least one power supply input falls below a threshold level;

wherein the power loss detector is coupled to the first and second supply terminals, the power loss detector to clamp a voltage between the first supply terminal and the second supply terminal to produce a step voltage, wherein a falling edge of the step voltage comprises a power loss indicator.

10. The powered device of claim 9, wherein the power loss detector comprises:

at least one diode responsive to the at least one power supply input;

a diode circuit coupled to the at least one diode, the diode circuit defining a breakdown voltage level related to the power loss event; and a comparator responsive to the diode circuit, the comparator to generate an indicator of the power loss event when the voltage level falls below the threshold voltage level.

11. The powered device of claim 9, wherein the power loss detector generates a power loss indicator when the voltage level is less than the threshold level.

12. The powered device of claim 11, further comprising a load circuit coupled to the first and second supply terminals, the load circuit to receive the power loss indicator and to perform a controlled power shutdown in response to the power loss indicator.

13. The powered device of claim 9, wherein the power loss detector includes a thermal protection switch to initiate the power shutdown in response to a thermal overload event.

14. The powered device of claim 9, wherein the power loss detector includes an initialization switch to disable the power loss detector from initiating the power shutdown during an initialization mode.

15. A method comprising:

monitoring an input voltage at an input port of a powered device, the powered device including power circuitry responsive to the input port to rectify the input voltage to produce a rectified voltage supply;

comparing the input voltage to a threshold voltage level;

detecting a power loss event when the input voltage falls below the threshold voltage level; and clamping a voltage between the first supply terminal and the second supply terminal to produce a step voltage having a falling edge that represents a power loss indicator to initiate a power shutdown of associated circuitry in response to detecting the power loss event;

wherein the power loss event is detected concurrently while the rectified voltage supply of the associated input voltage is being produced.

16. The method of claim 15, wherein a capacitor is coupled to the power circuitry to filter the rectified voltage supply and to discharge when a power loss event occurs, and wherein the power loss event is detected before a rectified voltage level falls below the threshold voltage level.

17. The method of claim 15, wherein the power loss event is detected in parallel with production of the rectified voltage supply.

18. The method of claim 15, wherein monitoring the input voltage comprises:

transferring the input voltage from the input port to a node;

level-shifting the input voltage from the node to an input of a comparator using a diode circuit comprising a plurality of diodes in series, wherein a breakdown voltage of the diode circuit defines the threshold voltage level; and producing a comparator output responsive to the input to drive a voltage level of a power loss output pin, the comparator input relating to the input voltage;

wherein the method further comprises shunting the rectified power supply between a first voltage supply terminal and a second voltage supply terminal to produce a step signal on the first and second voltage supply terminals.

* * * * *